United States Patent [19]
Hanson et al.

[11] Patent Number: 5,596,878
[45] Date of Patent: Jan. 28, 1997

[54] METHODS AND APPARATUS FOR OPERATING A REFRIGERATION UNIT

[75] Inventors: Jay L. Hanson, Bloomington; James E. Nixon, Woodbury; Stanley O. Hoium, Eagan; Peter W. Freund, Bloomington, all of Minn.

[73] Assignee: Thermo King Corporation, Minneapolis, Minn.

[21] Appl. No.: 494,453

[22] Filed: Jun. 26, 1995

[51] Int. Cl.$^6$ .................................................. F25B 13/00
[52] U.S. Cl. ............................ 62/160; 62/230; 62/238.7; 62/323.1
[58] Field of Search ......................... 62/133, 160, 323.1, 62/513, 113, 324.6, 230, 238.1, 238.6, 238.7, 324.1; 237/2 B

[56] References Cited

U.S. PATENT DOCUMENTS

| | | |
|---|---|---|
| 4,624,109 | 11/1986 | Minovitch . |
| 4,697,434 | 10/1987 | Yuyama .............................. 62/323.1 X |
| 4,850,197 | 7/1989 | Taylor et al. . |
| 5,003,788 | 4/1991 | Fischer .................................... 62/238.7 |
| 5,020,320 | 6/1991 | Talbert et al. ......................... 62/238.7 |
| 5,029,449 | 7/1991 | Wilkinson . |
| 5,095,712 | 3/1992 | Narreau . |
| 5,119,884 | 6/1992 | DeBeer . |
| 5,131,237 | 7/1992 | Valbjorn . |
| 5,174,123 | 12/1992 | Erickson . |
| 5,228,301 | 7/1993 | Sjoholm et al. . |
| 5,243,825 | 9/1993 | Lin ..................................... 62/324.1 X |
| 5,429,179 | 7/1995 | Klausing ............................. 236/2 B X |

*Primary Examiner*—Harry B. Tanner

[57] ABSTRACT

A refrigeration unit of the type having an economizer cycle driven by a prime mover cooled by a liquid coolant. Electrical control configures refrigerant flow paths of the unit to provide heating and cooling cycles, as required to control the temperature of a conditioned space to a predetermined set point temperature. Heat from the liquid coolant is used to enhance the heating cycle. A heating cycle is initiated immediately, when required, when the temperature of the liquid coolant is above a predetermined temperature. A heating cycle is delayed by a special refrigeration cycle which increases the load on the prime mover, when the temperature of the liquid coolant is not above the predetermined temperature. In a preferred embodiment of the invention, the special refrigeration cycle provides simultaneous heating and cooling cycles, which include evaporating liquid refrigerant in an evaporator associated with the conditioned space, as in a cooling cycle, while condensing hot gas refrigerant from the compressor in a condenser associated with the conditioned space, as in a heating cycle.

18 Claims, 5 Drawing Sheets

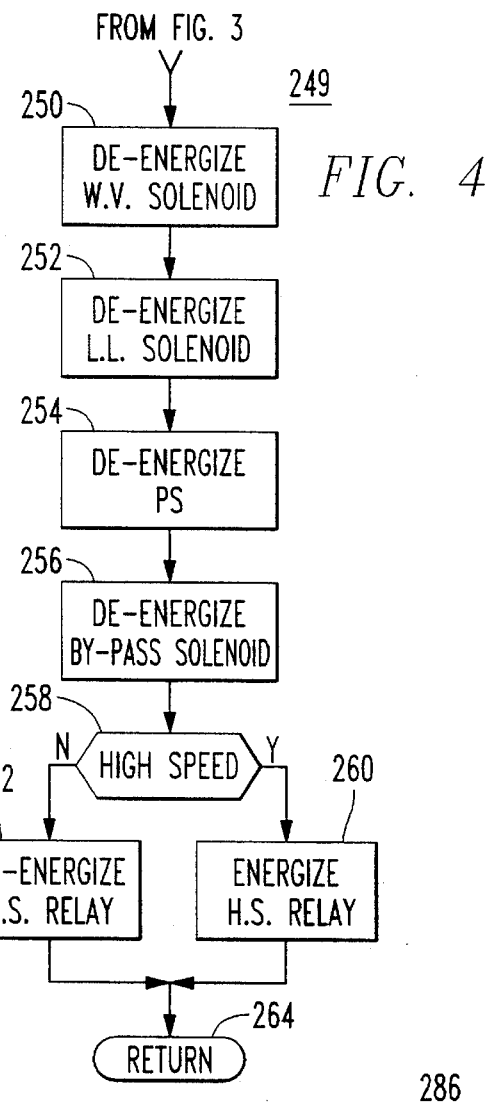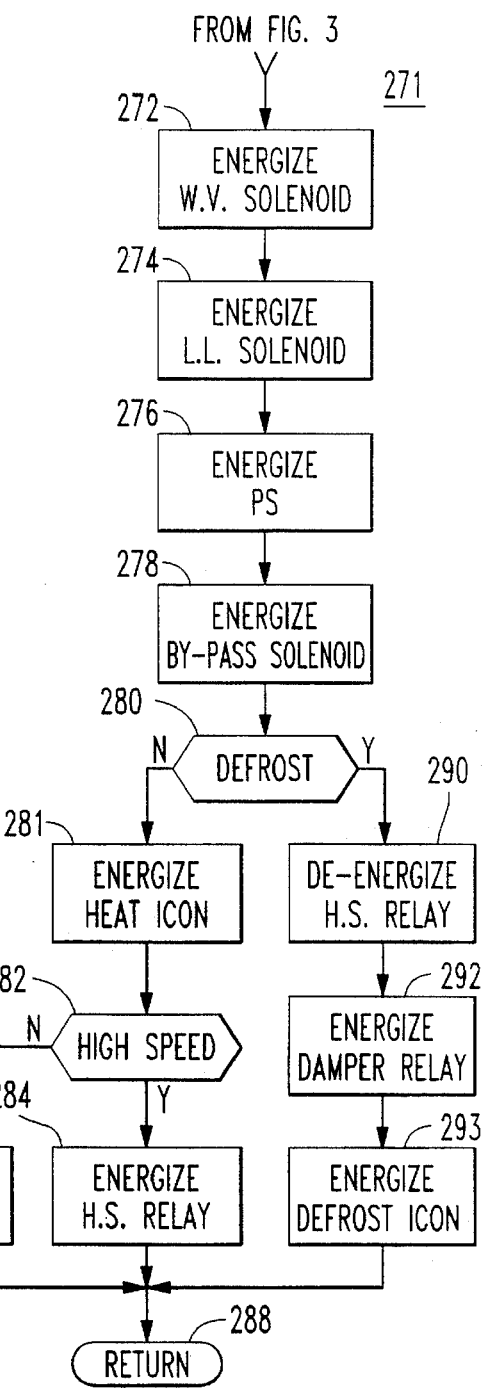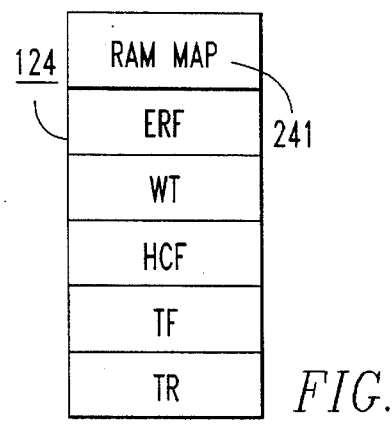
FIG. 4
FIG. 5
FIG. 6

METHODS AND APPARATUS FOR OPERATING A REFRIGERATION UNIT

TECHNICAL FIELD

The invention relates in general to refrigeration units, and more specifically to refrigeration units which utilize a compressor having an intermediate pressure port, such as a screw compressor.

BACKGROUND ART

U.S. Pat. No. 4,850,197, which is assigned to the same assignee as the present application, discloses a vapor compression refrigeration unit based on an economizer cycle which utilizes a refrigerant compressor having an intermediate pressure port, in addition to suction and discharge ports. An economizer heat exchanger is used to enhance hot gas cooling and heating cycles which are initiated by associated electrical or electronic control to achieve and maintain a predetermined temperature range close to a selected set point temperature in a conditioned space.

U.S. Pat. No. 5,174,123, which is assigned to the same assignee as the present application, discloses refrigeration methods and apparatus which utilize a flash tank in a refrigeration unit which has an economizer cycle, in place of an economizer heat exchanger. The disclosed refrigeration arrangement eliminates the need for a float valve in the flash tank, enabling the flash tank to be used in transport refrigeration applications.

A refrigeration unit having an economizer cycle enhances the heating cycle by adding heat to the refrigerant in an economizer heat exchanger, or a flash tank, hereinafter collectively referred to simply as an economizer heat exchanger. This heat may be added to the economizer heat exchanger, for example, by circulating liquid coolant from a liquid cooled compressor prime mover, eg., an internal combustion engine, in heat exchange relation with the refrigerant in the economizer heat exchanger. During such a heating cycle hot gas refrigerant from the compressor is discharged into a condensing heat exchanger associated with the conditioned space, and the condensed refrigerant is then evaporated in the economizer heat exchanger while heat is added to the refrigerant from the liquid coolant. We have found that under certain conditions, heat is drawn from the liquid coolant in the economizer heat exchanger so rapidly that the liquid coolant can freeze.

Thus, it would be desirable, and it is an object of the invention, to improve the reliability and efficiency, as well as the control methods and arrangements, of a refrigeration unit in which a refrigerant compressor having discharge, suction and intermediate ports is driven by a liquid cooled internal combustion engine, with the refrigeration unit having an economizer cycle, such as the refrigeration units disclosed in the hereinbefore mentioned patents.

It would be desirable, and it is another object of the invention, to improve the reliability and efficiency of a refrigeration unit having an economizer cycle, during a hot gas heating cycle, notwithstanding start-up of the unit and internal combustion engine during low ambient temperature conditions, which may cause problems associated with freezing of the liquid coolant used to enhance the hot gas heating cycle.

SUMMARY OF THE INVENTION

Briefly, the invention includes a method of operating a refrigeration unit having a compressor driven by a liquid cooled prime mover, and an economizer cycle which enhances cooling and heating cycles initiated to control the temperature of a conditioned space to a predetermined set point temperature. The enhancing of the heating cycle includes adding heat to the economizer cycle from liquid used to cool the prime mover. The method includes the steps of sensing the temperature of the liquid which cools the prime mover, initiating a heating cycle when required, when the sensing step detects the temperature of the liquid is above a predetermined value, and initiating a special refrigeration cycle when a heating cycle is required, prior to the step of initiating the heating cycle, when the sensing step detects the temperature is not above the predetermined value. The step of initiating the special cycle includes the step of increasing the load on the prime mover, at least until the sensing step detects that the temperature of the liquid is above the predetermined value. In a preferred embodiment of the invention, the step of increasing the load on the prime mover includes the step of providing simultaneous heating and cooling cycles.

The invention also includes a refrigeration unit having a compressor driven by a prime mover cooled by a liquid coolant, temperature sensing means for sensing the temperature of the liquid coolant, control means for selectively configuring refrigerant flow paths of the refrigeration unit to provide heating and cooling cycles, as required to control the temperature of a conditioned space to a predetermined set point temperature, and economizer heat exchanger means having means for adding heat to the heating cycle from the liquid coolant. The control means immediately initiates a heating cycle, when required, when the temperature sensing means detects that the temperature of the liquid coolant is above a predetermined value. The control means provides a predetermined special refrigerant flow path which increases the load on the prime mover above that provided by the heating cycle, when a heating cycle is required and the temperature sensing means detects the temperature of the liquid coolant is not above the predetermined value, to heat the liquid coolant above the predetermined temperature before initiating a heating cycle. In a preferred embodiment, the special refrigeration cycle provided by the control means configures the refrigerant flow paths of the refrigeration unit to provide simultaneous heating and cooling cycles.

BRIEF DESCRIPTION OF THE DRAWINGS

The invention will become more apparent by reading the following detailed description in conjunction with the drawings, which are shown by way of example only, wherein:

FIG. 4 is a detailed flow diagram of a program which implements a normal cooling cycle for the refrigeration unit shown in FIG. 1;

FIG. 5 is a detailed flow diagram of a program which implements a normal hot gas heating cycle for the refrigeration unit shown in FIG. 1; and FIG. 6 is a ROM map which lists certain variables utilized by the programs shown in FIGS. 3, 4 and 5.

DESCRIPTION OF PREFERRED EMBODIMENTS

Figure 1:
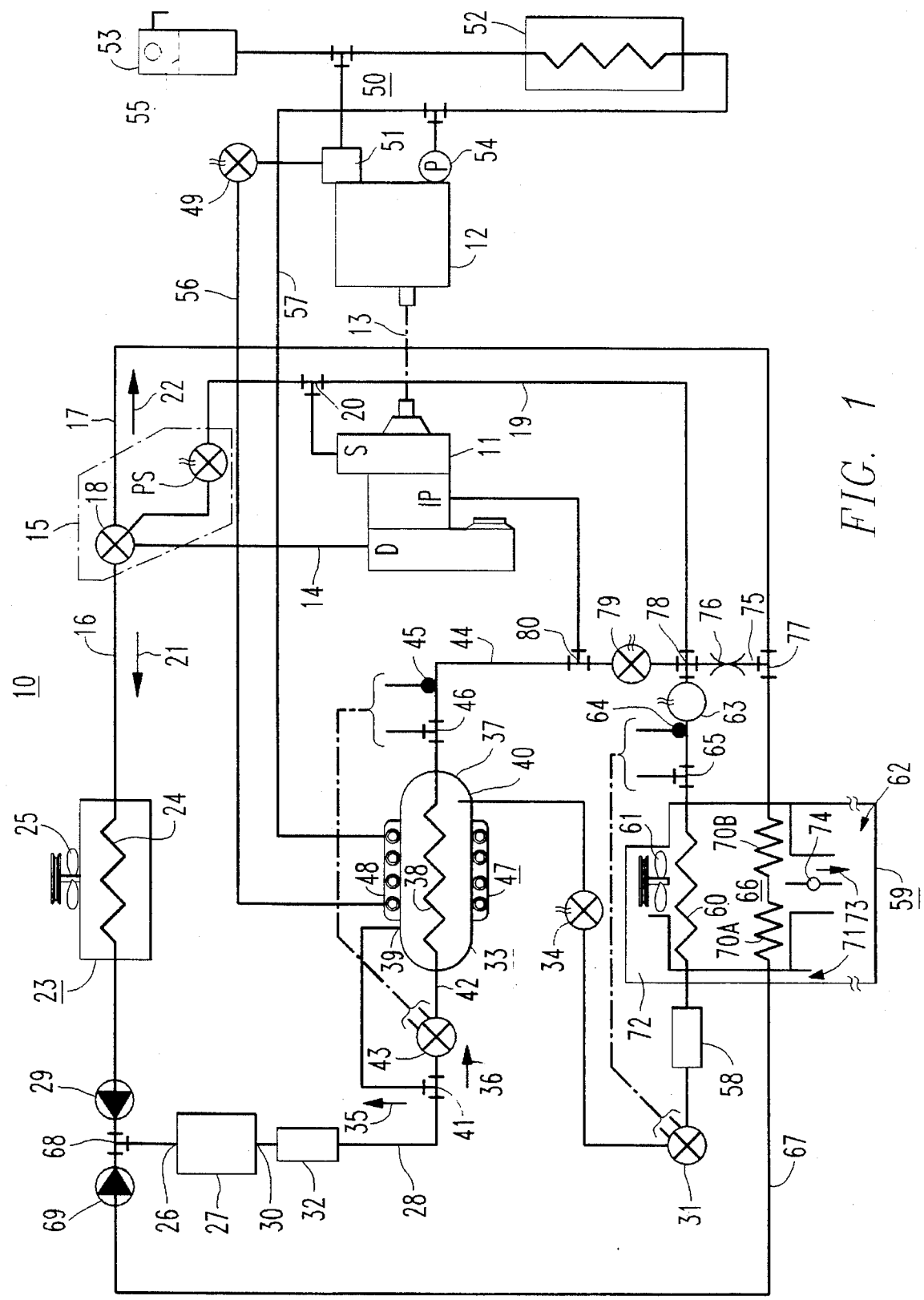
FIG. 1 is a refrigerant flow path diagram of a refrigeration unit which may be operated according to the teachings of the invention, with the refrigeration unit having an economizer cycle provided by economizer heat exchanger means and an intermediate pressure port on a refrigerant compressor.

As used in the following description and claims, the term "conditioned space" includes any space to be temperature and/or humidity controlled, including stationary and transport applications, for the preservation of foods and other perishables, maintenance of a proper atmosphere for the shipment of industrial products, space conditioning for human comfort, and the like. The term "refrigeration unit" is used to generically cover both air conditioning systems for human comfort, and refrigeration systems for preservation of perishables and shipment of industrial products. When it is stated that the temperature of a conditioned space is controlled to a selected set point temperature, it is to be understood that the temperature of the conditioned space is controlled to a predetermined temperature range adjacent to the selected set point temperature. In FIG. 1, controllable valves which are normally open (n.o.) are illustrated with an empty circle, and controllable valves which are normally closed (n.c.) are illustrated with an "X" within a circle. Of course, the associated electrical or electronic control, hereinafter called "electrical control", may be changed to reverse the de-energized states shown.

Referring now to the drawings, and to FIG. 1 in particular, there is shown a refrigeration unit 10 constructed according to the teachings of the invention. Refrigeration system 10 is of the type having an economizer cycle, including a refrigerant compressor 11 having a suction port S, a discharge port D, and an intermediate pressure port IP. Compressor 11, for example, may be a screw compressor, such as the screw compressor shown in U.S. Pat. No. 5,246,357, which is assigned to the same assignee as the present application. Compressor 11 is driven by a liquid cooled prime mover, such as internal combustion engine 12, eg., a diesel engine, linked to compressor 11 as indicated generally by broken line 13.

A compressor hot gas discharge line 14 connects the discharge port D of compressor 11 to first controllable valve means 15. The first controllable valve means 15 connects the compressor hot gas discharge line 14 to a selected one of first and second hot gas outlet lines 16 and 17. As illustrated in FIG. 1, the first controllable valve means 15 may include a normally closed pilot solenoid valve PS and a three-way valve 18. Pilot solenoid valve PS selectively connects the low pressure side of compressor 11 to the three-way valve 18, such as by tapping a main suction line 19 via a tee 20, with the main suction line 19 being connected to the suction port S of compressor 11. Pilot solenoid valve PS is controlled by electrical control shown in FIGS. 2A and 2B, which will be hereinafter described. U.S. Pat. No. 5,074,329 describes a three-way valve which may be used. In general, three-way valve 18 connects the input hot gas line 14 to the first hot gas outlet line 16 when pilot solenoid PS is de-energized (closed), and to the second hot gas outlet line 17 when pilot solenoid PS is energized (open). While three-way valve 30 is preferred, the function of the first controllable valve means 15 may also be provided by two coordinated solenoid valves.

The first and second hot gas outlet lines 16 and 17 respectively direct hot compressor discharge gas to cooling and heating refrigerant flow paths 21 and 22. The cooling flow path 21 includes main refrigerant condenser means 23 which includes a condenser coil 24 and condenser air mover means 25. The first hot gas outlet line 16 is connected to an inlet side of condenser coil 24, and an outlet side of condenser coil 24 is connected to an inlet 26 of a refrigerant receiver 27 via a main liquid line 28 which includes a check valve 29. The cooling flow path 21 and main liquid line 28 continue from an outlet 30 of receiver 27 to an inlet side of an evaporator expansion valve 31, via a refrigerant dehydrator or dryer 32, economizer heat exchanger means 33, and second controllable valve means 34. The second controllable valve means may be a normally open solenoid valve, which will be hereinafter be referred to as liquid line solenoid valve 34. Liquid line solenoid valve 34 is controlled by the electrical control shown in FIGS. 2A and 2B.

Economizer heat exchanger means 33, which may be an economizer heat exchanger, as illustrated, or a flash tank, includes first and second refrigerant flow paths 35 and 36, respectively, with the first refrigerant flow path 35 being a main flow path of the liquid refrigerant during a cooling cycle. The second flow path 36 diverts and expands a portion of the liquid refrigerant from the main flow path 35 and causes the resulting cool vapor to sub-cool the liquid refrigerant in the main flow path 35 and thus enhance the cooling cycle. As illustrated, the first refrigerant flow path 35 includes a shell or housing 37 disposed to surround a heat exchanger coil 38 which is connected in the second refrigerant flow path 36. Shell 37 includes a refrigerant inlet 39 and a refrigerant outlet 40. The second flow path 36 taps the main liquid line 28 via a tee 41 and a conduit 42, with an economizer expansion valve 43 being connected in conduit 42 between tee 41 and heat exchanger coil 38. Thus, a portion of the liquid refrigerant flowing through the main liquid line 28 is diverted through the economizer expansion valve 36 into the second refrigerant flow path 36, to provide an economizer cycle by subcooling liquid refrigerant flowing through shell 37 in heat exchange relation with heat exchanger coil 38. Heat exchanger coil 38 is connected to the intermediate pressure port IP of compressor 11 via an auxiliary suction line 44. Refrigerant in auxiliary suction line 44 is at a higher pressure than refrigerant returning to suction port S of compressor 11, and this higher pressure refrigerant is thus returned to the higher pressure intermediate port IP.

Economizer expansion valve 43 is controlled by a thermal bulb 45 and an equalizer line 46, both of which are associated with the auxiliary suction line 44. Thus, refrigerant flow rate through the second refrigerant flow path 36 of economizer heat exchanger means 33 is controlled by the economizer expansion valve 43 as a function of the refrigerant temperature and pressure at auxiliary suction line 44.

Economizer heat exchanger means 33 also includes heating means 47 for selectively adding heat to the refrigerant flowing through economizer heat exchanger means 33 during a hot gas heating cycle and during a hot gas defrost cycle. Heating means 47 includes a heating or water jacket 48 connected to receive heated liquid coolant from engine 12 via third controllable valve means 49, which may be a normally closed solenoid valve controlled by the electrical control shown in FIGS. 2A and 2B. The third controllable valve means 49 will be hereinafter called water solenoid valve 49. Liquid coolant for heating means 47 is tapped from a liquid coolant flow path 50 associated with engine 12, which coolant flow path includes a thermostat 51, a radiator 52, an expansion tank 53, and a water pump 54. The engine coolant is indicated by a broken line 55 in expansion tank 53, and thus the engine coolant will be referred to as coolant 55. Coolant 55 enters an inlet side of water jacket 48 via a first conduit 56 which includes the thermostat 51 and water solenoid valve 49. Coolant 55 is returned from water jacket 48 to the water pump 54 via a second conduit 57.

While heat from engine coolant 55 is illustrated as being added to the external side of shell 37, it is to be understood that liquid coolant 55 may be directed to heat exchanger means disposed within shell 37.

The cooling refrigerant flow path 21 continues from evaporator expansion valve 31, which separates high and low pressure sides of the cooling refrigerant flow path 21, via a refrigerant distributor 58 which distributes refrigerant to evaporator means 59. Evaporator means 59 includes an evaporator coil 60, which has a plurality of flow paths all receiving refrigerant from distributor 58, and evaporator air mover means 61. Air mover means 61 circulates air between a conditioned space 62 and evaporator coil 60. An outlet side of evaporator coil 60 is connected to the hereinbefore mentioned main suction line 19, via a proportional modulation valve 63, as illustrated, which is controlled by the electrical control shown in FIGS. 2A and 2B; or, a mechanical suction line throttling valve may be used, as desired. The flow through the first flow path 35 of economizer heat exchanger means 33, ie., the refrigerant flow during a cooling cycle, is thus controlled by the evaporator expansion valve 31, which controls flow rate according to the degree of superheat and vapor pressure of the refrigerant vapors leaving evaporator coil 60, as indicated by a thermal bulb 64 and an equalizer line 65.

The heating refrigerant flow path 22 includes the second hot gas outlet line 17, auxiliary condenser means 66, and an auxiliary liquid line 67. Auxiliary condenser means 66 is associated with evaporator means 59 and is thus also in heat exchange relation with conditioned space 62. The second hot gas outlet line 17 is connected to an inlet side of auxiliary condenser means 66, and an outlet side of auxiliary condenser means 66 is connected to the auxiliary liquid line 67. Auxiliary liquid line 67 taps the main liquid line 28 via a tee 68. A check valve 69 is disposed in the auxiliary liquid line 67 to prevent flow from the outlet of condenser coil 24 to the auxiliary condenser means 66.

The auxiliary condenser means 66 is preferably divided into first and second serially connected coil sections 70A and 70B which respectively function as a heat exchanger coil for adding heat to conditioned space 62 and as a defrost pan heater coil. The heat exchanger coil 70A may be constructed, for example, by using one or more tube rows which make up the tube bundle of evaporator coil 60. Return air from conditioned space 62, indicated by arrow 71, is drawn into a plenum 72 by evaporator air mover means 61, and evaporator air mover means 61 discharges conditioned air, ie., air which has passed in heat exchange relation with evaporator coil 60 and heat exchanger coil 70A, back into conditioned space 62. Conditioned discharge air is indicated by arrow 73.

Figure 2A:
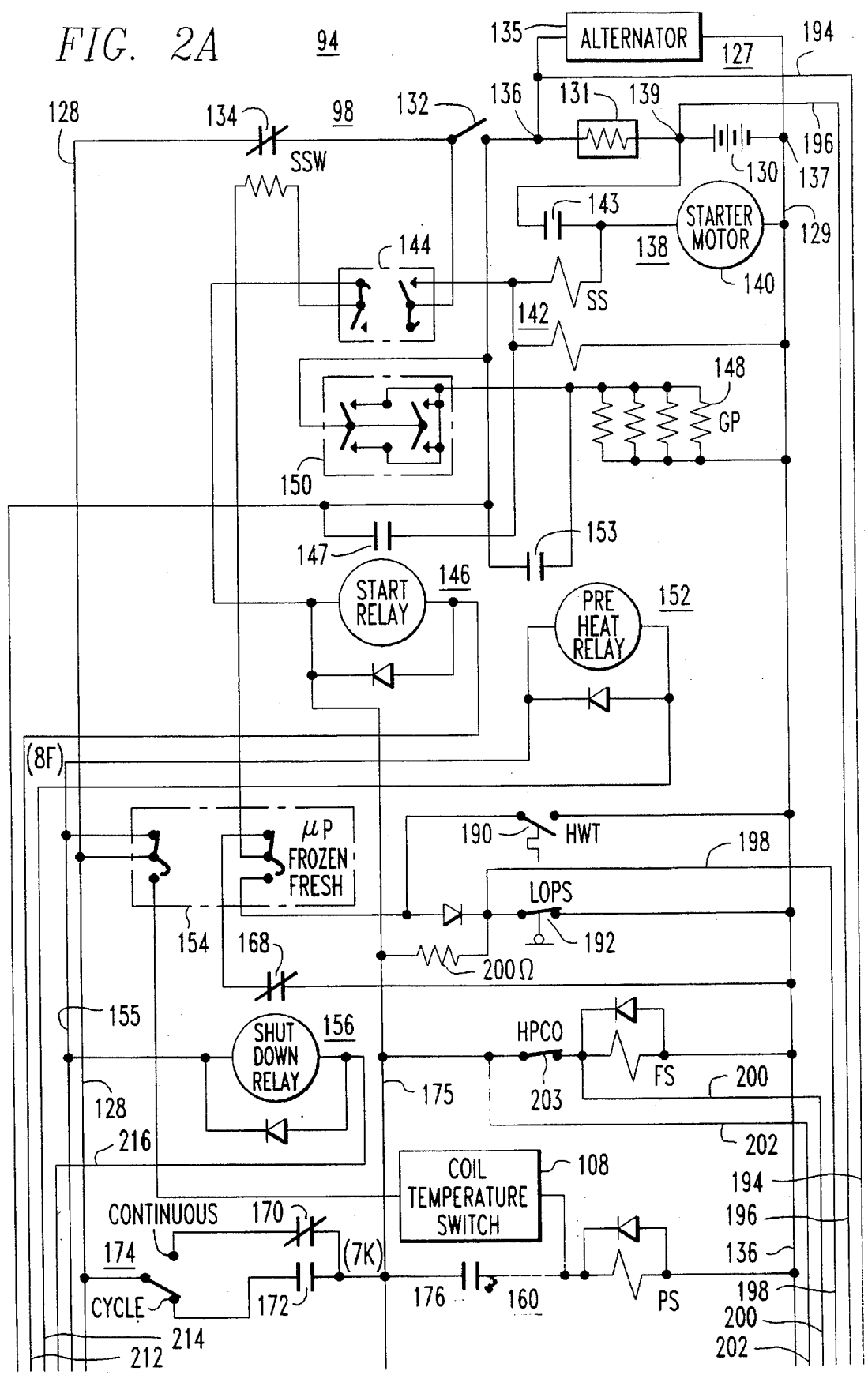
FIGS. 2A and 2B schematically illustrate electrical control for operating the refrigeration unit shown in FIG. 1 according to the teachings of the invention.
Figure 2B:
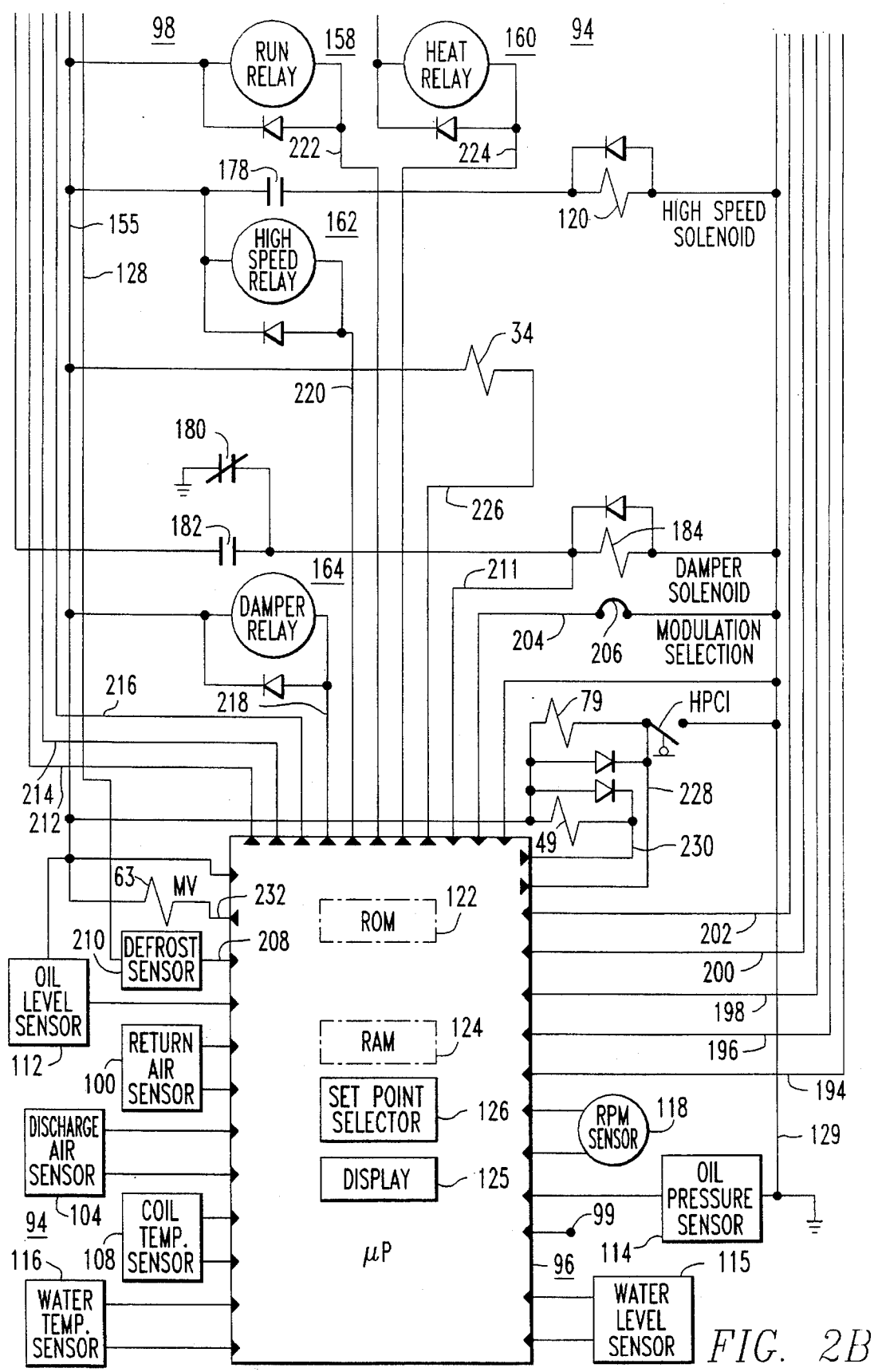

A defrost damper 74, controlled by the electrical control shown in FIGS. 2A and 2B, is closed during a heating cycle initiated to defrost evaporator coil 60, to prevent warm air from being discharged into conditioned space 62.

A refrigerant vent line 75 is also provided, with vent line 75 having a predetermined small orifice dimension, as indicated at 76. Vent line 75 is connected to apply suction pressure to the heating refrigerant flow path 22 during a cooling cycle, to enhance the cooling cycle without adding to the overall refrigerant requirements of the system, by forcing refrigerant trapped in the heating flow path 22, between three-way valve 18 and check valve 69, into the cooling flow path 21. Vent line 75, for example, may be connected from a tee 77 in hot gas line 17 to a junction 78 in suction line 19, as illustrated. Since during a heating/defrost cycle vent line 75 will create a capacity loss, vent orifice 76 is preferably selected to be in a range of about 0.03 to 0.1 inch (0.8–2.5 mm), to minimize this capacity loss.

As is common with compressors which have an intermediate pressure port IP, a normally closed valve 79, hereinafter called economizer by-pass valve 79, is provided, which, when open, allows refrigerant vapor to flow to the suction port S. Economizer by-pass valve 79 is controlled by the electrical control shown in FIGS. 2A and 2B. Economizer by-pass valve 79 may be internal to compressor 11, or external, as desired, with economizer by-pass valve 79, as illustrated, being connected from a tee 80 in the auxiliary suction line 44 to the junction 78 in the main suction line 19. A normal duty for economizer by-pass valve 79 is to be open during a heating/defrost cycle, to preclude any limitation on compressor pumping capability. If compressor 11 were to pump only through the intermediate pressure port IP during a heating/defrost cycle, the pumping capability may be limited, and a vacuum may also be pulled on the main suction line 19. By providing an open flow path between the auxiliary and main suction lines 44 and 19 via the open by-pass valve 79, these problems are eliminated. By-pass valve 79 may also be selectively opened during a cooling cycle as part of a temperature control algorithm, to unload compressor 11 for temperature control in the conditioned space 62 as a selected set point temperature SP is approached. The set point temperature SP of conditioned space 62 is selected via a set point temperature selector associated with the electrical control shown in FIGS. 2A and 2B.

In order to construct and operate refrigeration system 10 with economical sizing of the various heat exchangers and engine 12 relative to the compressor 11, and at the same time keep compressor discharge pressure and temperature, and engine load under control, both the evaporator expansion valve 31 and the economizer expansion valve 43 are preferably maximum operating pressure (MOP) valves, each with a maximum operating pressure setting selected to be optimum for the associated operating mode. The evaporator MOP expansion valve 31 controls during a cooling cycle and has a relatively low setting, compared with the setting of economizer MOP expansion valve 43, which controls refrigerant flow during a heat/defrost cycle.

FIGS. 2A and 2B, when assembled, provide a detailed schematic diagram of electrical control 94, which includes a microprocessor based controller 96 and electrical control 98. Electrical controller 96, as hereinbefore stated, controls the first controllable valve means 15, ie., pilot solenoid PS and three-way valve 18, liquid line solenoid valve 34, water solenoid valve 49, and economizer by-pass valve 79. Controller 96 also receives inputs from various sensors, such as an ambient air temperature sensor 99, a return air temperature sensor 100 which senses the temperature of the air indicated by arrow 71 in FIG. 1, a discharge air temperature sensor 104 which senses the temperature of the air indicted by arrow 73 in FIG. 1, and a temperature sensor and switch 108 which senses the temperature of evaporator coil 60. Controller 96 also receives input from a plurality of sensors associated with the operation of engine 12, including an oil level sensor 112, oil pressure sensor 114, engine coolant level sensor 115, engine coolant temperature sensor 116, and engine speed or RPM sensor 118.

Controller 96, among other things, controls a throttle or high speed solenoid 120 which selects predetermined high and low operating speeds of engine 12, when energized and de-energized, and the magnitude of current flow through a control coil associated with the proportional modulation valve 63.

Controller 96 includes a read-only memory (ROM) 122 for storing application specific programs to be hereinafter described, and a random-access memory (RAM) 124 for storing a software timer, program flags, input signals, output signals, and other program variables generated by the application specific programs. Controller 96 also includes a display 125 for displaying alarm or fault codes, for continuously illuminating, or flashing, an alarm icon or indicator, for displaying system status via status lights, and the like, such as described in U.S. Pat. No. 5,123,251, which is assigned to the same assignee as the present application. A set point temperature selector 126 selects the desired temperature SP of conditioned space 62.

Electrical control 98 includes a power supply 127 having first and second conductors 128 and 129, respectively. Power supply 127 includes a battery 130 which has one side connected to the first power supply conductor 128 via a DC current measuring shunt 131 which measures battery charge and discharge current. Control 98 further includes an on-off switch 132, and normally closed contacts 134 of a protective reset switch SSW. The remaining side of battery 130 is connected to the second power supply conductor 129, which is grounded. Power supply 127 further includes a generator or alternator 135 driven by engine 12, with the generator or alternator 135 being connected from a junction point 136 between switch 132 and current shunt 131 to a junction point 137 on grounded conductor 129. Junction points 136 and 137 form output terminals of power supply 127 which provide a voltage and current to the circuits and components connected thereto.

Control 98 also includes engine starting apparatus 138 for engine 12, with engine starting apparatus 138 having a portion which is connected directly to battery 130, eg., to a junction point 139 between battery shunt 131 and battery 130, and a portion which is connected to power supply output terminal 136. The portion of engine starting apparatus 138 which is connected to junction point 139 includes a starter motor 140 which is controlled by a starter solenoid (SS) 142 having associated normally open contacts 143, an ignition switch 144, and a start relay 146 having associated normally open contacts 147. The portion of starting apparatus 138 which is connected to power supply output terminal 136, to enable current draw to be measured by the battery shunt 131, includes engine pre-heat control, including glow plug (GP) resistors 148, a pre-heat switch 150, and a pre-heat relay 152 having normally open contacts 153.

Control 98 also includes a three-position switch 154 which has two banks of three terminals each comprising a center terminal and upper and lower terminals, with reference to FIG. 2A. Switch 154, in the illustrated upper position which connects the center terminal to the upper terminal, places refrigeration unit 10 under control of controller 96. The upper position provides voltage from power supply conductor 128 to a conductor 155. An intermediate position of switch 154, in which the center terminal is not connected to either the upper terminal or the lower terminal, is selected when controller 96 is not utilized and the load in the conditioned load space 62 is frozen. This switch position will cause unit 10 to operate continuously in a low speed cool mode LSC. The lower position of switch 154 is selected when controller 96 is not utilized and the load in conditioned load space 62 is non-frozen. This position of switch 154 will cause unit 10 to operate continuously, switching between heating and cooling modes or cycles under the control of the hereinbefore mentioned evaporator coil temperature sensor and switch 108. Evaporator coil temperature sensor and switch 108 is preset to close at a predetermined coil temperature, such as 35 degrees F. (1.7° C.), to energize the pilot solenoid PS and initiate a heating cycle, and to open at a predetermined higher temperature, such as 38° F. (3.3° C.), to de-energize pilot solenoid PS and initiate a cooling cycle.

In addition to the control devices or relays already mentioned, control 98 includes control devices in the form of a shutdown relay 156, a run relay 158, a heat relay 160, a high speed relay 162, and a defrost damper relay 164. Shutdown relay 156 is normally energized, and is de-energized to shut refrigeration unit 10 down via an associated set of normally-closed contacts 168 which ground the protective switch SSW and cause it to open its contacts 134. Run relay 158 has normally open contacts 172 connected to an operating mode selector switch 174 which has an input connected to conductor 128. Selector switch 174 selects either: (1) a continuous operating mode in which engine 12 operates continuously; or, (2) a cycling start-stop operating mode, which includes starting and stopping of engine 12.

Contacts 172 of run relay 158 provide voltage to a conductor 175 from conductor 128 and mode selector switch 174. Run relay 158 must be energized to enable the starting and running of refrigeration unit 10 via internal combustion engine 12.

Heat relay 160 has a set of normally open contacts 176 for controlling the pilot solenoid PS. High speed relay 162 has a set of normally open contacts 178 for controlling the high speed solenoid 120. Damper relay 164 has a set of normally closed contacts 180 and a set of normally open contacts 182, connected to control a defrost damper solenoid 184 which is linked to defrost damper 74 shown in FIG. 1.

Control 98 also includes an engine coolant temperature switch (HWT) 190, which closes when the engine coolant 55 reaches a predetermined elevated temperature, and a low oil pressure switch (LOPS) 192 which is open as long as engine oil pressure is normal. The closing of either switch 190 or 192 will shut unit 10 down via the manual reset switch SSW.

Controller 96 senses the voltage across the battery shunt 131 via conductors 194 and 196, and can thus determine the magnitude and polarity of battery current. One polarity, which will be called positive, indicates the battery 130 is being charged by alternator 135, and also indicates that engine 12 is running. The other polarity, ie., negative, indicates battery 130 is discharging.

Controller 96 also has a conductor 198 which senses the position of the low oil pressure switch 192, conductors 200 and 202 which sense the voltage level on first and second sides, respectively, of a high refrigerant pressure cut-out (HPCO) switch 203, a conductor 204 which senses whether or not a suction line modulation valve selector jumper 206 has connected conductor 204 to system ground conductor 129, a conductor 208 which senses whether or not a defrost sensor switch 210 has operated, signifying the need for a defrost cycle, and a conductor 211 which detects voltage on the damper solenoid 184.

Controller 96 has a plurality of output conductors or drive lines for controlling the energization and de-energization of a plurality of control devices, including conductors 212, 214, 216, 218, 220, 222, 224, 226, 228 and 230 for respectively controlling the operation of start relay 146, pre-heat relay 152, shutdown relay 156, damper relay 164, high speed relay 162, run relay 158, heat relay 160, liquid line solenoid valve 34, and water solenoid valve 49. A conductor 232 is also provided for controlling the current level in a control coil associated with suction line modulation valve 64. In order to prevent refrigerant pressure from becoming too high when economizer bypass valve 79 is closed, economizer by-pass valve 79 may be automatically energized in response to a predetermined refrigerant pressure by a normally open high pressure cut-in switch HPCI.

As the various functions performed by controller 96 are described, only those necessary for understanding the invention will be described in detail. Reference may be had to U.S. Pat. Nos. 5,123,252; 5,123,253; 5,140,825; and 5,140,826, which are assigned to the same assignee as the present application, for a more detailed explanation.

Figure 3:
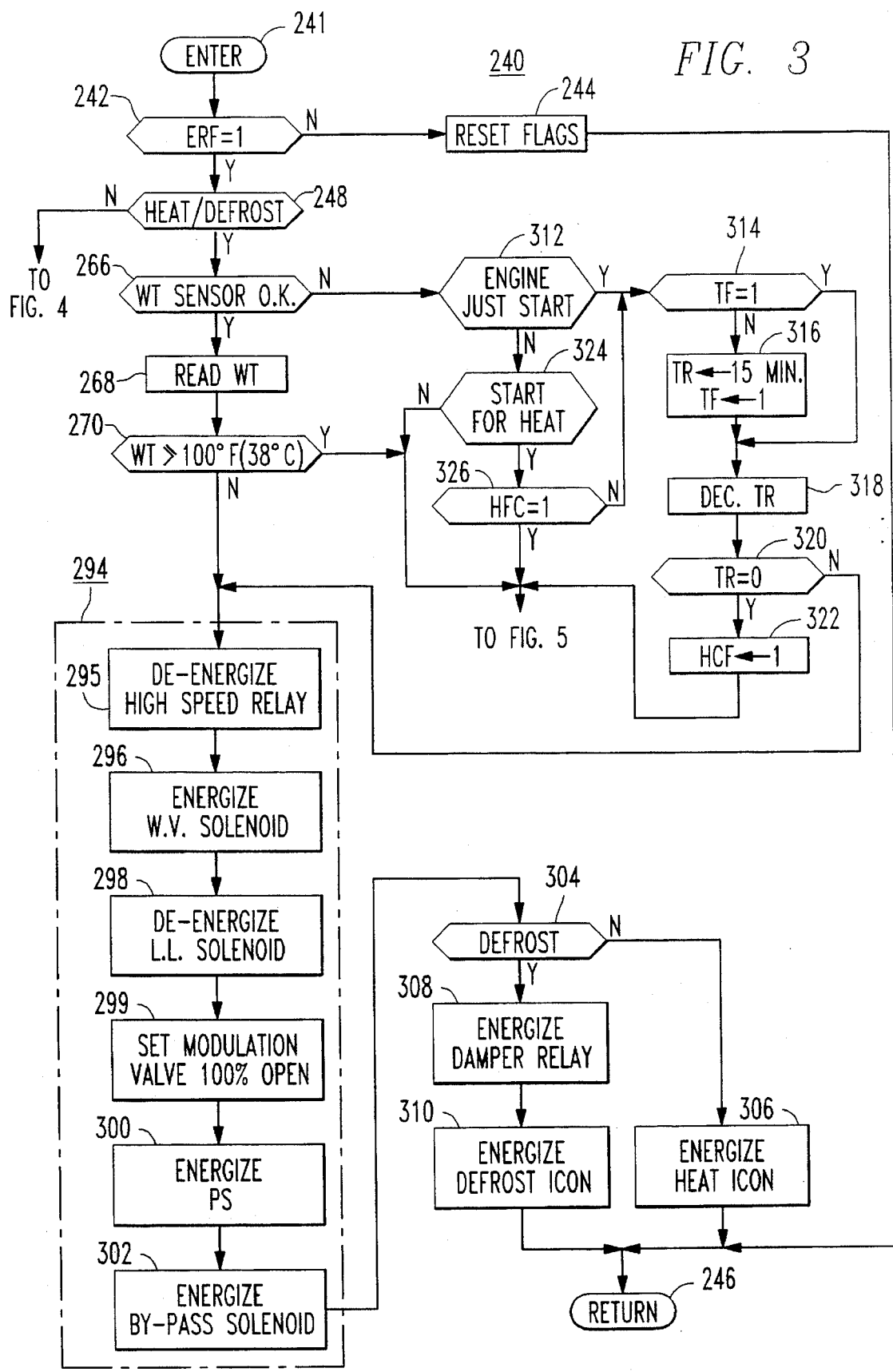
FIG. 3 is a detailed flow diagram of a program which operates the refrigeration unit according to the teachings of the invention, initiating a special heating cycle prior to a normal heating cycle, in response to a predetermined parameter, or parameters, of the refrigeration unit shown in FIG. 1.

FIGS. 3, 4 and 5, in combination, illustrate a detailed flow diagram of a program 240 which operates refrigeration unit 10 according to the teachings of the invention. FIG. 6 illustrates a RAM map 241 of RAM 124 shown in FIG. 2B, listing certain flags, a timer, and a sensor value used during the running of program 240.

Program 240 is entered periodically at 241 and step 242 determines if engine 12 is running, such as be checking the state of an engine running flag ERF. When refrigeration unit 10 is operated in a start-stop cycling mode by a cycle mode temperature control algorithm, which mode is selected by one of the positions of switch 174 of FIG. 2A, there will be times when the conditioned space 62 is satisfied and engine 12 will be stopped to enter a NULL cycle. The hereinbefore mentioned U.S. Pat. No. 5,123,252 illustrates different temperature control algorithms which may be used.

When the temperature of the conditioned space 62 rises out of the NULL temperature zone, engine 12 will be started with refrigeration unit 10 in a cooling cycle. When the temperature of conditioned space 62 falls out of the NULL temperature zone, engine 12 will be started with refrigeration unit 10 in a heating cycle.

When step 242 finds engine 12 is not running, step 244 resets program flags associated with the running of program 240 and program 240 is exited at return 246. Program 240 continues to cycle through steps 242 and 244 until step 242 finds that engine 12 has been started, at which point step 248 determines if control 94 is calling for a heating or a cooling cycle. When step 248 finds that a cooling cycle has been requested, program 240 branches to FIG. 4, which illustrates a program branch 249 which implements a cooling cycle.

As shown in FIG. 4, step 250 de-energizes the normally closed water solenoid valve 49, to prevent liquid coolant 55 from circulating through the water jacket 48 of economizer heat exchanger means 33. Step 252 de-energizes the normally open liquid line solenoid valve 34 to permit liquid refrigerant to flow to the evaporator expansion valve 31, and thus to the evaporator coil 60. Step 254 de-energizes the normally closed pilot solenoid PS, which causes three-way valve 18 to select the cooling cycle flow path 21 which directs hot refrigerant from the discharge port D of compressor 11 to the main condenser coil 24. Step 256 de-energizes the normally closed economizer by-pass solenoid valve 79, since refrigerant is returned to the suction port S and the intermediate pressure port IP from two different refrigerant flow paths, which have different vapor pressures. Step 258 determines if the applicable temperature control algorithm is calling for high speed cool (HSC) or low speed cool (LSC). Engine 12, for example, may operate at 2200 RPM during high speed operation, selected by energizing high speed relay 162 and thus the solenoid 120 shown in FIG. 2B, and at 1400 RPM during low speed operation selected by de-energizing the high speed relay 162 and thus the high speed solenoid 120. When high speed operation is called for, step 258 proceeds to step 260 which energizes high speed relay 162, and when low speed operation is called for, step 258 proceeds to step 262 which de-energizes high speed relay 162. Program branch 249 is exited at return point 264.

Thus, during a cooling cycle, liquid refrigerant flowing through the first flow path 35 of the economizer heat exchanger means 33 is cooled by expanded and evaporated refrigerant flowing through the second flow path 36 of the economizer heat exchanger. The vaporized refrigerant from the second flow path 36 is returned to the intermediate pressure port IP of compressor 11. Refrigerant evaporated in evaporator 60 is returned to the main suction port S of compressor 11.

When step 248 finds that a heating cycle has been requested by the applicable temperature control algorithm, either to add heat to conditioned space 62, or to defrost evaporator coil 60, step 266 determines if the engine coolant sensor 116 is functioning properly. The hereinbefore mentioned U.S. Pat. No. 5,123,253 illustrates a sensor checking program which may be used to determine if temperature sensor 116 is functioning properly. When engine coolant temperature sensor 116 is O.K., step 268 reads the coolant temperature WT being reported by sensor 116, and step 270 compares the coolant temperature WT with a predetermined temperature value, such as 100° F. (38° C.). This predetermined temperature is selected such that when WT is above this temperature, it is known that freezing problems will not be encountered when using engine coolant 55 to enhance a heating cycle. When WT is below this predetermined temperature, it is known that freezing problems may be encountered.

When step 270 finds that WT is above the predetermined temperature value, the heating cycle is immediately implemented by proceeding to FIG. 5 which illustrates a program branch 271 which implements the heating cycle. Step 272 in FIG. 5 energizes engine coolant solenoid valve 49 to tap the coolant flow path 50 and allow hot liquid coolant 55 to circulate through water jacket 48 of economizer heat exchanger means 33, which adds heat to the refrigerant flowing through the second flow path 36 of the economizer heat exchanger 33, and enhance the heating cycle. Step 274 energizes the normally open liquid line solenoid valve 34, to close the liquid line 28 and thus prevent refrigerant flow through evaporator coil 60. Step 276 energizes the normally closed pilot solenoid valve 276 to shift three-way valve 18 to direct hot refrigerant gas from the discharge port D of compressor 11 to the heating cycle flow path 22. Step 278 energizes the normally closed economizer by-pass solenoid valve 79 to enable refrigerant from the second flow path 36 of economizer heat exchanger 33 to return to both the intermediate pressure port IP and the suction port S of compressor 11.

Step 280 determines if the heating cycle was initiated to add heat to conditioned space 62, or to defrost evaporator coil 60. When step 280 finds that heat is required for conditioned space 62, step 281 energizes a "heat" icon on display 125 shown in FIG. 2B, and step 282 determines if the applicable temperature control algorithm is calling for high or low engine speed. When high engine speed is required, step 284 energizes high speed relay 162, and when low engine speed is required, step 286 de-energizes high speed relay 162. Program branch 271 is exited at return point 288. When step 280 finds that a defrost cycle has been requested, step 290 de-energizes high speed relay 162 to select the low engine speed for the defrost cycle, step 292 energizes damper relay 164 shown in FIG. 2B, which energizes damper solenoid 184 to close damper 74 shown in FIG. 1, and step 293 energizes a "defrost" icon on display 125. Step 292 exits program branch 271 at the return point 288.

Thus, during a normal heating cycle heat is added to conditioned space 62 via the auxiliary condenser coil 70A associated with conditioned space 62, and the heating cycle is enhanced by transferring heat from the liquid coolant 55 to the second flow path 36 of the economizer heat exchanger means 33.

When step 270 finds that the temperature WT of the liquid coolant 55 is in a temperature range which may cause freezing problems when applied to economizer heat exchanger means 33 during a normal heating cycle, a portion 294 of program 240 is entered which: (1) delays entering a normal heating cycle until the temperature of coolant 55 has been raised to the predetermined temperature value chosen for step 270, (2) implements a special heating cycle which reduces the flow of refrigerant through the second flow path 36 of the economizer heat exchanger means 33, to thus reduce the rate of heat removal from liquid engine coolant 55, and (3) configures the flow paths of refrigeration unit 10 such that the resulting special heating cycle applies a much greater load to engine 12 than is applied to engine 12 during a normal heating cycle. In a preferred embodiment of the invention, the refrigerant flow paths of unit 10 are configured by program 240 to provide simultaneous heating and cooling cycles, which results in a relative small net heat gain in evaporator means 59, but which rapidly heats the engine coolant 55 such that the normal heating cycle shown in FIG. 5 may be subsequently entered without encountering freezing problems in water jacket 48. The phrase "providing simultaneous heating and cooling cycles" means that both the evaporator coil 60 and the auxiliary condenser means 66 are activated at the same time. During the simultaneous heating and cooling cycles the heating flow path 22 is activated while liquid line solenoid 34, which is normally closed during a heating cycle, is opened.

More specifically, program branch or portion 294 is initiated by a step 295 which de-energizes high speed relay 162 so that the increased load added to engine 12 by program branch 294 is applied to engine 12 while it is operating at low speed, which will thus heat coolant 55 more rapidly. Step 296 energizes coolant solenoid valve 49 to enable engine coolant 55 to circulate through water jacket 48. Step 298 de-energizes the normally open liquid line solenoid valve 34, which, as hereinbefore stated, is normally done only during a cooling cycle, to apply the evaporator coil 60 as a load to engine 12. Step 299 terminates any current flow through the control coil of proportional modulation valve 63, to cause it to be wide open, which presents the greatest load on engine 12. Step 300 energizes pilot solenoid valve PS to select the heating position of three-way valve 18, directing hot refrigerant gas from hot gas line 14 to the heating cycle flow path 22. Step 302 energizes the normally closed economizer by-pass valve 79, even though refrigerant is being returned to both the intermediate pressure port IP and the suction port S of compressor 11. This is done to apply a back pressure on the intermediate port IP, which reduces the flow rate of the refrigerant through the second flow path 36 of economizer heat exchanger means 33. Thus, even though liquid coolant 55 is allowed to flow through water jacket 48 during this special heating cycle, heat is not removed from the coolant 55 as rapidly as in a normal heating cycle, thus preventing any freezing problems in water jacket 48 during the special heating cycle.

Step 302 then advances to step 304 which determines if this heating cycle has been initiated to add heat to conditioned space 62, or to defrost evaporator coil 60. If conditioned space heating is required, step 306 energizes the "heat" icon on display 125 and program 240 is exited at the program return 246. When step 304 finds that evaporator coil defrosting is required, step 308 energizes damper relay 164 to close damper 73, step 310 energizes the "defrost" icon on display 125, and step 310 proceeds to the program return point 246.

Should step 266 find that the coolant temperature sensor 116 has malfunctioned, step 266 branches to step 312 which determines if engine 12 has just started. For example, the state of the engine start flag ERF from the previous running of program 240 may be stored and compared with the state of flag ERF on this running of program 240. A change from logic zero to logic one will detect an engine start. When step 312 finds that engine 12 has just been started, it is known that engine 12 was started to implement a heating cycle because program 240 arrived at step 312 from the "heat" branch of step 248. In this instance, the special heat cycle implemented by program branch 294 is run for a predetermined period of time, to insure that the temperature of liquid coolant 55 will be high enough that no freezing problems will be encountered in economizer heat exchanger means 33. For example, when engine 12 is started to implement a heating cycle, the special heating cycle of program branch 294 may be operated for 15 minutes.

This 15 minute running of special program branch 294 includes a step 314 which checks a timer flag TF shown in the RAM map 241 of FIG. 6, to determine if a delay timer TR has been started. At this point delay timer TR will not be active, and step 316 loads delay timer with the desired delay time period, eg., 15 minutes, and step 316 also sets timer flag TF. Step 318 then decrements timer TR and step 320 determines if the delay time period has expired. When step 320 finds the delay time period has not expired, step 320 proceeds to the hereinbefore program branch 294, which implements the special heating cycle. When step 320 finds that the delay period has expired, step 320 proceeds to step 322, which sets a heat cycle flag HCF, which, when set, indicates the normal heat cycle of FIG. 5 may be implemented. Step 322 thus proceeds to FIG. 5.

On subsequent runs through program 240, after step 312 found engine 12 had just been started, step 312 branches to step 324, which determines if engine 12 was started to implement a heating cycle. If engine 12 was started to implement a heating cycle, step 324 proceeds to step 326 which checks heat cycle flag HCF to determine if the 15 minute delay period has expired. If the delay period has not expired, step 326 returns to step 314. If the delay period has expired, step 326 proceeds to FIG. 5, to implement the normal heat cycle. When step 324 finds that engine 12 was started to implement a cooling cycle, and now has switched to a heating cycle, such as to defrost evaporator coil 60, the running of engine 12 during the cooling cycle will heat engine coolant 55 sufficiently to prevent any freezing problems in the economizer heat exchanger 33, and step 324 advances immediately to the heating cycle implemented in FIG. 5.

We claim:

1. A method of operating a refrigeration unit having a compressor driven by a liquid cooled prime mover, and an economizer cycle which enhances cooling and heating cycles initiated to control the temperature of a conditioned space to a predetermined set point temperature, with the enhancing of the heating cycle including adding heat to the economizer cycle from liquid used to cool the prime mover, comprising the steps of:

sensing the temperature of the liquid which cools the prime mover, initiating a heating cycle when required, when the sensing step detects the temperature of the liquid is above a predetermined value, and initiating a special refrigeration cycle when a heating cycle is required, prior to the step of initiating the heating cycle, when the sensing step detects the temperature is not above the predetermined value, said step of initiating the special cycle including the step of increasing the load on the prime mover, at least until the sensing step detects that the temperature of the liquid is above the predetermined value.

2. The method of claim 1 wherein the step of increasing the load on the prime mover includes the step of providing simultaneous heating and cooling cycles.

3. The method of claim 2 wherein the step of providing simultaneous heating and cooling cycles includes the steps of:

evaporating refrigerant in an evaporator associated with the conditioned space, and condensing refrigerant in a condenser associated with the conditioned space.

4. The method of claim 2 wherein the step of initiating simultaneous heating and cooling cycles includes the steps of:

passing liquid refrigerant through a first flow path of economizer heat exchanger means, evaporating liquid refrigerant in a second flow path of the economizer heat exchanger means, and passing liquid coolant from the prime mover through a third flow path of the economizer heat exchanger means.

5. The method of claim 4 including the steps of directing liquid refrigerant from the first flow path of the economizer heat exchanger means to an evaporator associated with the conditioned space, directing refrigerant from the evaporator to a suction port of the compressor, directing refrigerant from the second flow path of the economizer heat exchanger means to an intermediate pressure port of the compressor, and directing refrigerant from a discharge port of the compressor to a condensing heat exchanger associated with the conditioned space.

6. The method of claim 5 including the step of interconnecting the suction port and the intermediate port of the compressor to increase the pressure at the intermediate pressure port and reduce the flow of refrigerant through the second flow path of the economizer heat exchanger.

7. The method of claim 1 wherein the refrigeration unit includes a suction line modulation valve, and wherein the refrigeration cycle includes the step of fully opening the suction line modulation valve.

8. The method of claim 1 wherein the prime mover is an internal combustion engine operable at a selected one of high and low speeds, and wherein the special refrigeration cycle includes the step of selecting the low engine operating speed.

9. The method of claim 1 wherein the step of sensing the temperature of the liquid coolant is performed by a temperature sensor, and including the steps of:

determining when the temperature sensor is not functioning correctly, and initiating the special refrigeration cycle for a predetermined period of time when the prime mover is started to initiate a heating cycle and the determining step finds that the temperature sensor is not functioning correctly.

10. A refrigeration unit having a compressor driven by a prime mover cooled by a liquid coolant; temperature sensing means for sensing the temperature of the liquid coolant; control means for selectively configuring refrigerant flow paths of the refrigeration unit to provide heating and cooling cycles, as required to control the temperature of a conditioned space to a predetermined set point temperature; and economizer heat exchanger means having means for adding heat to the heating cycle from the liquid coolant, characterized by:

said control means immediately configuring the refrigeration flow paths to initiate a heating cycle, when required, when the temperature sensing means detects that the temperature of the liquid coolant is above a predetermined value, said control means configuring the refrigerant flow paths to provide a predetermined special refrigerant flow path which increases the load on the prime mover above that provided by the heating cycle, when a heating cycle is required and the temperature sensing means detects the temperature of the liquid coolant is not above the predetermined value, to heat the liquid coolant above the predetermined temperature before initiating a heating cycle.

11. The refrigeration unit of claim 10 wherein the special refrigerant flow path provided by the control means configures the refrigerant flow paths of the refrigeration unit to provide simultaneous heating and cooling cycles.

12. The refrigeration unit of claim 11 wherein the special refrigerant flow path includes:

refrigerant evaporator means associated with the conditioned space, which is normally in the refrigerant flow path configuration only during a cooling cycle, and refrigerant condenser means associated with the conditioned space, which is normally in the refrigerant flow path configuration only during a heating cycle.

13. The refrigeration unit of claim 11 wherein the special refrigerant flow path includes:

means directing refrigerant through a first flow path of the economizer heat exchanger means, means directing refrigerant through a second flow path of the economizer heat exchanger means, means evaporating liquid refrigerant in the second flow path of the economizer heat exchanger means, and means directing liquid coolant from the prime mover through a third flow path of the economizer heat exchanger means.

14. The refrigeration unit of claim 13 wherein the special refrigerant flow path includes:

evaporator means associated with the conditioned space, means directing refrigerant from the first flow path of the economizer heat exchanger means to said evaporator means, means directing refrigerant from the evaporator to a suction port of the compressor, means directing refrigerant from the second flow path of the economizer heat exchanger means to an intermediate pressure port of the compressor, refrigerant condensing means associated with the conditioned space, and means directing refrigerant from a discharge port of the compressor to said refrigerant condensing means.

15. The refrigeration unit of claim 14 including means interconnecting the suction port and the intermediate port of the compressor during a heating cycle to increase the pressure at the intermediate pressure port and reduce the flow of refrigerant through the second flow path of the economizer heat exchanger means.

16. The refrigeration unit of claim 10 wherein the refrigeration unit includes a suction line modulation valve, with the special refrigerant flow path including said suction line modulation valve in a fully open condition.

17. The refrigeration unit of claim 10 wherein the prime mover is an internal combustion engine operable at a selected one of high and low speeds, and including means for operating the internal combustion engine at low speed when the control means provides the special refrigerant flow path.

18. The refrigeration unit of claim 10 including sensor checking means for determining when the coolant temperature sensing means is not functioning correctly, with the control means configuring the refrigerant flow paths to provide the predetermined refrigerant flow path for a predetermined period of time when the prime mover is started to implement a heating cycle and the sensor checking means determines that the coolant temperature sensor is not functioning correctly.

* * * * *